(No Model.) 2 Sheets—Sheet 1.
E. B. KUNKLE.
POP SAFETY VALVE AND MUFFLER.
No. 524,208. Patented Aug. 7, 1894.
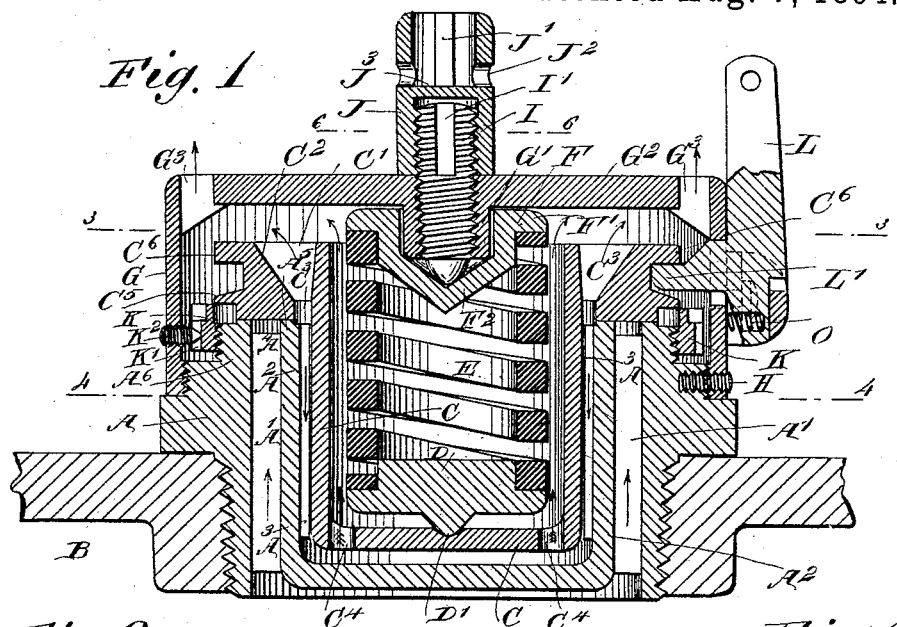
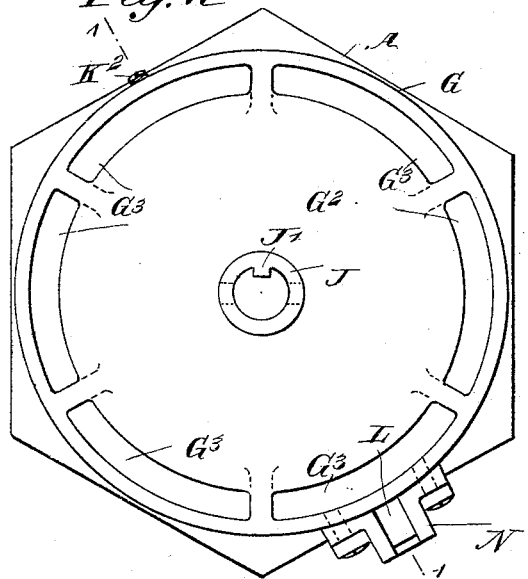
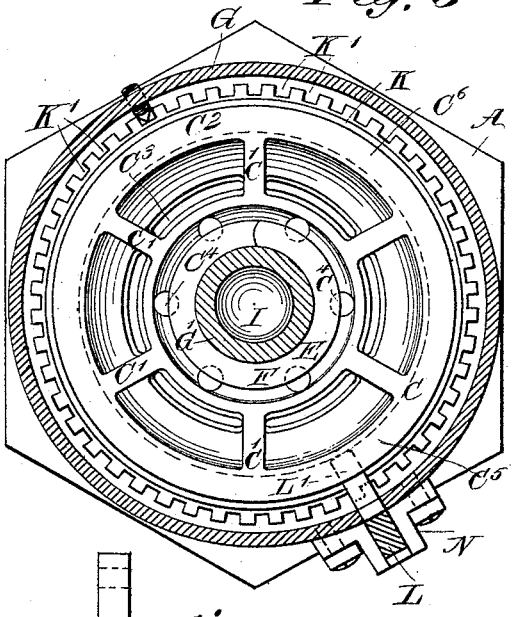
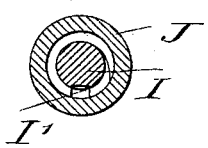
WITNESSES:
C. Neveux
C. Sedgwick
INVENTOR
E. B. Kunkle
BY
Munn & Co.
ATTORNEYS.

(No Model.) 2 Sheets—Sheet 2.
E. B. KUNKLE.
POP SAFETY VALVE AND MUFFLER.

No. 524,208. Patented Aug. 7, 1894.

WITNESSES:
C. Neveux
C. Sedgwick

INVENTOR
E. B. Kunkle
BY
Munn & Co.
ATTORNEYS.

UNITED STATES PATENT OFFICE.

ERASTUS B. KUNKLE, OF FORT WAYNE, INDIANA, ASSIGNOR TO HIMSELF AND WILLIAM D. BOSTICK, OF SAME PLACE.

POP SAFETY-VALVE AND MUFFLER.

SPECIFICATION forming part of Letters Patent No. 524,208, dated August 7, 1894.

Application filed February 16, 1894. Serial No. 500,349. (No model.)

*To all whom it may concern:*

Be it known that I, ERASTUS B. KUNKLE, of Fort Wayne, in the county of Allen and State of Indiana, have invented certain new and useful Improvements in Pop Safety-Valves and Mufflers, of which the following is a full, clear, and exact description.

The invention relates to safety valves such as shown and described in the Letters Patent of the United States No. 446,757, granted to me February 17, 1891.

The object of the present invention is to provide certain new and useful improvements in pop safety valves and mufflers, whereby a powerful discharge of the steam is obtained and the boiler immediately relieved of any over pressure.

The invention consists principally of a valve body carrying a cup forming a steam space between it and the said valve body, and a cup-shaped valve extending into the said valve body cup and forming a steam space between it and the valve body cup, the said valve being provided with an exterior seat flange adapted to be seated on the valve body and its cup.

The invention also consists of certain parts and details and combinations of the same, as will be hereinafter described and then pointed out in the claims.

Reference is to be had to the accompanying drawings, forming a part of this specification, in which similar letters of reference indicate corresponding parts in all the figures.

Figure 7:
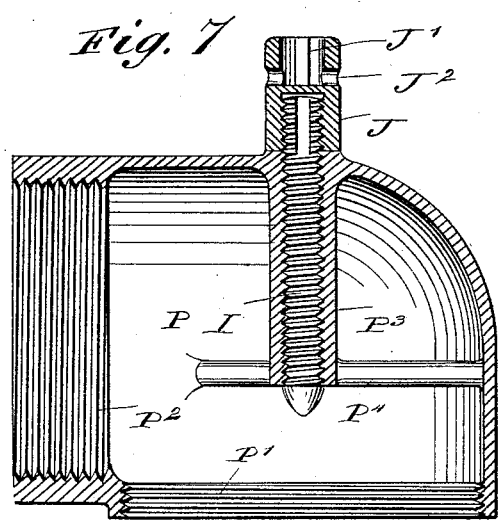
Figure 8:
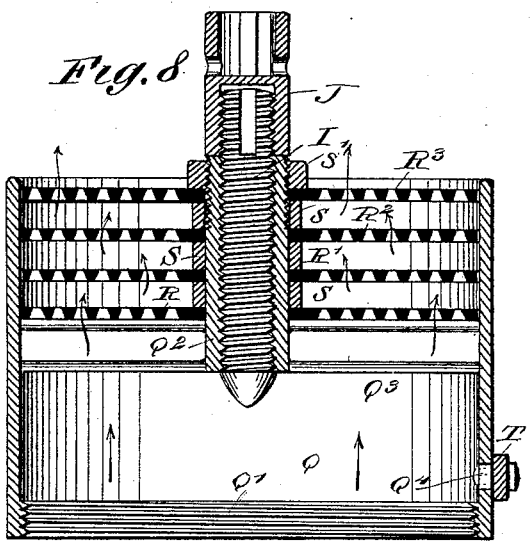
Figure 4:
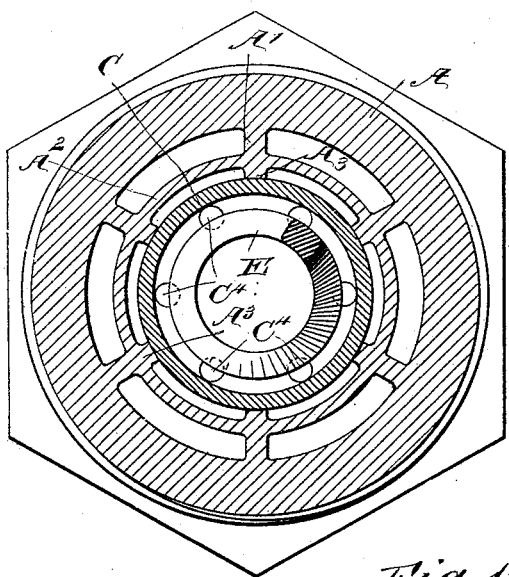
Figure 9:
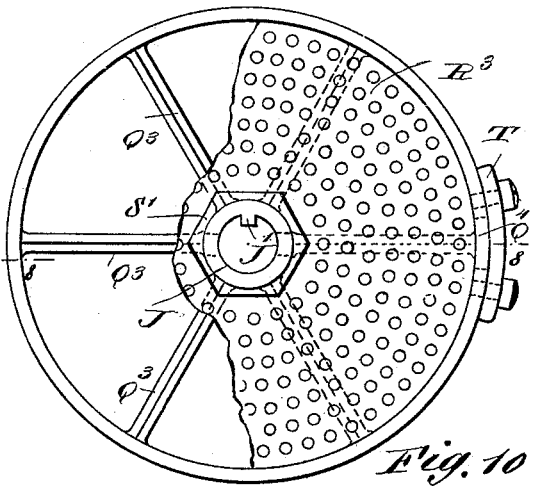
Figure 11:
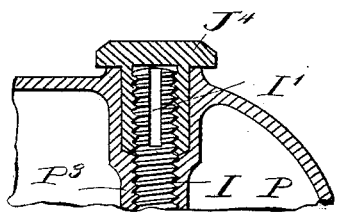
Figure 12:
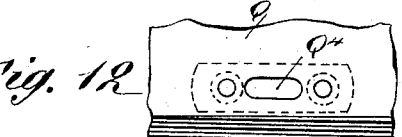
Figure 10:
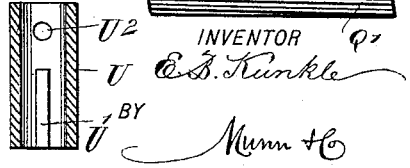

Figure 1 is a sectional side elevation of the improvement on the line 1—1 of Fig. 2. Fig. 2 is a plan view of the same. Fig. 3 is a sectional plan view of the same on the line 3—3 of Fig. 1. Fig. 4 is a similar view of the same on the line 4—4 of Fig. 1. Fig. 5 is an elevation of the relief lever and its bearing. Fig. 6 is a sectional plan view of the adjusting screw and its jam nut, the section being taken on the line 6—6 of Fig. 1. Fig. 7 is a sectional side elevation of a cap of a modified form. Fig. 8 is a sectional side elevation of the cap containing the mufflers. Fig. 9 is a plan view of the same with parts broken out. Fig. 10 is an inside elevation of part of the cap shown in Fig. 8. Fig. 11 is a sectional side elevation of a modified form of jam nut in the cap shown in Fig. 7; and Fig. 12 is a sectional side elevation of a key for the spring regulating screw.

The improved safety valve is provided with a cylindrical valve body A, adapted to be screwed or otherwise fastened on the boiler B, as is indicated in Fig. 1. The cylindrical valve body A is provided on its inner surface with vertically extending projections or wings A', connected with a cup $A^2$, extending concentric within the valve body A, as is plainly illustrated in Figs. 1 and 4. On the inner face of this cup $A^2$ are arranged vertically disposed projections or wings $A^3$, preferably in alignment with the wings A', as is plainly shown in Fig. 4, the said wings $A^3$ forming a bearing surface for the cup-shaped valve C extending into the valve body $A^2$. It will be seen that by the arrangement described a steam space is formed between the valve body A and the side walls of its cup $A^2$, and a similar steam space is formed between the walls of the said cup-shaped valve C and the wall of the valve body cup $A^2$.

On the upper end of the cup-shaped valve C are formed outwardly extending wings C' supporting a flange $C^2$ adapted to be seated with its under face on the upper edges of seats $A^4$ and $A^5$ of the valve body A and its cup $A^2$. The wings C' do not extend to the lower or bottom surface of the seat flange $C^2$, so as to leave an annular space $C^3$ between the lower part of the flange $C^2$ and the wall of the valve C, see Fig. 1. In the bottom of the valve C is arranged a series of openings $C^4$, to permit the steam passing down the space between the cup $A^2$ and the valve C, to pass through the said openings into the cup and out of the same, at the upper end thereof. The flange $C^2$ is supported from the valve C in such a manner that when the flange is seated on the body A and cup $A^2$, then the bottom of the valve C stands a short distance above the bottom of the cup $A^2$, to permit the steam to readily pass through the openings $C^4$ into the valve C.

In the bottom of the cup-shaped valve C, and at the center thereof, is formed a recess engaged by a point D' formed on the under side of the disk D, on the top of which rests the lower end of a helical spring E, extending up in the valve C and engaging, with its upper end, the flange F' of a cup F formed with an inverted conical bottom F², as is plainly shown in Fig. 1. This cup F is fitted on a hub G', formed on the under side of the top G² of the cap G screwed on the valve body A, as is plainly shown in Fig. 1. The cap G is securely held in place on the valve body A by a set screw H screwing through the cap into the said valve body, as is plainly indicated in Fig. 1.

In the hub G' of the cap G screws the regulating screw I, engaging at its lower pointed end, the bottom F² of the cup F, the said screw serving to regulate the tension of the helical spring E bearing on the valve C, so as to hold the latter with the desired pressure at its flange C² on the seats A⁴ and A⁵ of the valve body A and its cup A². A jam nut J screws on the upper, projecting end of the regulating screw I, so as to securely lock the latter in place, the said jam nut J being formed in its upper, hollow portion with a tongue J' adapted to engage a recess or slot I' formed in one side of the regulating screw I at the time the jam nut is unscrewed from the said regulating screw and placed in an inverted position on the upper end of the regulating screw. By the operator then turning the jam nut J, he can conveniently screw the regulating screw I upward or downward, to regulate the tension of the helical spring E. In order to conveniently turn the nut J, I provide the same, in its upper portion, with apertures J² for the insertion of a suitable pin or other tool, to form a handle for turning the jam nut. The latter is also provided with a partition J³, to prevent dust or other impurities from passing to the regulating screw I.

In the top G² of the cap G are formed segmental slots G³ for the escape of the steam passing up into the cap at the time the valve flange C² is lifted off its two seats A⁴ and A⁵, by the excessive pressure of the steam from the boiler. The flange C² of the valve C is provided with two annular projections C⁵ and C⁶, of which the lower one C⁵, is adapted to be engaged by a ring K screwing on the reduced neck A⁶ of the valve body A, the said ring forming with the said projection C⁵, a huddling chamber for the steam previous to its escape from the cap G. This ring K is provided on its periphery with teeth K' adapted to be engaged by a set screw K² screwing in the side wall of the cap G, so as to securely lock the said ring in place on the valve body A after it is once properly adjusted.

The upper annular projection C⁶ of the valve flange C² is adapted to be engaged by the foot L' of an angular lever L, adapted to be taken hold of by the operator for lifting the flange C² off its seat whenever it is desired to relieve the boiler of steam. This lever L is set in a keeper N, secured to the outer face of the cap G, as is plainly shown in the drawings, the said lever being held normally in a vertical position by a spring O held in a recess in the lower end of the lever L and resting with its inner end on the cap G. The foot L' of the lever extends through a recess or slot in the wall of the cap G, as indicated in Fig. 1.

It is understood that the ring K is screwed up or down relative to the annular projection C⁵, so as to regulate the steam pressure in the huddling chamber, and to consequently regulate the opening and closing action of the valve, so as not to lose too much of the boiler pressure at the time the valve flange C² commences to open. The area of the under side of the annular projection C⁵ is equal to the area of the live steam space between the valve body A and its cup A², so that a powerful discharging valve is produced, as the steam acts on the said areas simultaneously.

When it is desired to regulate the steam escaping through the safety valve outside of the boiler room, then I prefer the elbow cap P, shown in Fig. 7, instead of the cap G above described in reference to Fig. 1. This elbow cap P is provided at one end with a screw thread P' for screwing the cap on the valve body A, and the other end of the said cap is provided with a screw thread P² for making connection with the pipe leading to the outside of the boiler room. In the cap P depends the threaded hub P³ in which screws the regulating screw I, for regulating the tension of the helical spring E, and the lower end of this hub P³, is supported on a spider P⁴, forming part of the elbow cap. On the upper end of the regulating screw I, screws the jam nut J previously described.

When it is desired to muffle the steam, I prefer to employ the cap Q shown in Figs. 8 and 9, the said cap being provided at its lower end with a thread Q', for screwing it on the valve body A instead of the cap G. This cap Q is provided with a central threaded hub Q² for the regulating screw I, and the hub is supported by a spider Q³ projecting from the side wall of the cap, as is plainly indicated in Figs. 8 and 9. On the top of the spider Q³ rests a perforated disk R, through which the steam has to pass when escaping from the cap Q, the said disk serving to break up the steam so as to muffle the same. In order to muffle the steam still more, I prefer to employ a series of such disks R', R², R³, located one above the other and separated one from the other by suitable washers S, as is indicated in Fig. 8. The uppermost disk R³ is held in place by a nut S', screwing on the upper threaded end of the hub Q². In the side wall of this cap Q is arranged an elongated opening Q⁴, adapted to be closed by a plate T bolted or otherwise fastened to the cup, as is plainly shown in Figs. 8 and 9. The slot Q⁴ permits the operator to adjust the ring K relative to the valve flange C, as previously described.

As shown in Fig. 11, the regulating screw I in the cap P, shown in Fig. 7, may be secured in place by a jam nut J⁴ fitted into an enlarged recess in the upper end of the hub P³, the head of the said jam nut J⁴ being seated on the top of the said cap P. In order to turn the regulating screw I for regulating the tension of the spring E, it is necessary to first unscrew this jam nut J⁴ and then insert a wrench U made in the shape shown in Fig. 12 and provided with an internal tongue U′ adapted to engage the slot I′ in the said regulating screw. The upper end of the said wrench U is provided with apertures U² for the insertion of a pin or other tool, to conveniently turn the wrench for screwing the regulating screw I up or down, to regulate the tension of the spring E, as previously described.

Having thus described my invention, I claim as new and desire to secure by Letters Patent—

1. A safety valve, comprising a valve body carrying a cup forming a steam space between it and the said valve body, and a cup-shaped valve extending into the said valve body cup and forming a steam space between it and the valve body cup, said second space leading to the under surface of the cup valve and communicating with the interior of the cup valve which in turn communicates with the valve outlet the said valve being provided with a seat flange adapted to be seated on the said valve body and its cup, substantially as shown and described.

2. A safety valve, comprising a valve body carrying a cup forming a steam space between it and the said valve body, and a cup-shaped valve extending into the said valve body cup and forming a steam space between it and the valve body cup, the said valve being provided with a seat flange adapted to be seated on the said valve body and its cup, and a regulating ring held adjustably on the said valve body and forming, with an annular projection on the said seat flange, a huddling chamber for the steam, substantially as shown and described.

3. A safety valve, comprising a valve body carrying a cup forming a steam space between it and the said valve body, and a cup-shaped valve extending into the said valve body cup and forming a steam space between it and the valve body cup, the said valve being provided with a seat flange adapted to be seated on the said valve body and its cup, the said flange being connected with the upper end of the valve by wings which form a steam space between the said flange and the valve, substantially as shown and described.

4. A safety valve, comprising a valve body carrying a cup forming a steam space between it and the said valve body, the said cup being provided at its inner face with bearing ribs, a cup-shaped valve set in the said valve body cup and fitted to slide on the said bearing ribs, forming a steam space with the said valve body cup, the bottom of the valve being provided with apertures for the escape of the steam, and a seat flange held on wings projecting from the upper end of the said valve, the said seat flange being adapted to be seated on the upper end of the said valve body and its cup, substantially as shown and described.

5. A safety valve, comprising a valve body carrying a cup forming a steam space between it and the said valve body, the said cup being provided at its inner face with bearing ribs, a cup-shaped valve set in the said valve body cup and fitted to slide on the said bearing ribs, forming a steam space with the said valve body cup, the bottom of the valve being provided with apertures for the escape of steam, and a seat flange held on wings projecting from the upper end of the said valve, the said seat flange being adapted to be seated on the upper ends of the said valve body and its cup, the said seat flange forming a steam space for the valve, and the said steam space registering with the steam space between the valve and the top of the valve body, substantially as shown and described.

6. A safety valve, comprising a valve body carrying a cup forming a steam space between it and the said valve body, the said cup being provided at its inner face with bearing ribs, a cup-shaped valve set in the said valve body cup and fitted to slide on the said bearing ribs, forming a steam space with the said valve body cup, the bottom of the valve being provided with apertures for the escape of the steam, a seat flange held on wings projecting from the upper end of the said valve, the said seat flange being adapted to be seated on the upper ends of the said valve body and its cup, and the said flange being also provided with an annular projection, and a ring held adjustably on the said valve body and adapted to form, with the said projection, a huddling chamber, substantially as shown and described.

7. A safety valve, comprising a valve body carrying a cup forming a steam space between it and the said valve body, the said cup being provided at its inner face with bearing ribs, a cup-shaped valve set in the said valve body cup and fitted to slide on the said bearing ribs, forming a steam space with the said valve body cup, the bottom of the valve being provided with apertures for the escape of the steam, a seat flange held on wings projecting from the upper end of the said valve, the said seat flange being adapted to be seated on the upper end of the said valve body and its cup, a spring bearing on the said valve, a regulating screw for varying the tension of the said spring, and a cap carrying the said regulating screw and secured on the said valve body, substantially as shown and described.

8. A safety valve provided with a cap supporting a series of perforated disks located one above the other, to form a muffler for the safety valve and provided with a central threaded hub for receiving a regulating screw, substantially as shown and described.

9. A safety valve provided with a jam nut for the regulating screw, the said jam nut also forming a wrench for adjusting the said regulating screw, substantially as shown and described.

10. In a safety valve, the combination with a regulating screw having a slot, of a jam nut for the said screw and formed with a tongue adapted to engage the said slot at the time the jam nut is reversed to use the latter as a wrench, substantially as shown and described.

ERASTUS B. KUNKLE.

Witnesses:
PAUL F. KUHNE,
H. R. KUHNE.